United States Patent [19]

Iwasaki

[11] 4,249,222
[45] Feb. 3, 1981

[54] RECORDING AND/OR REPRODUCING APPARATUS FOR REDUCING TAPE VIBRATION

[75] Inventor: Koichi Iwasaki, Chigasaki, Japan

[73] Assignee: Sony Corporation, Tokyo, Japan

[21] Appl. No.: 15,718

[22] Filed: Feb. 27, 1979

[30] Foreign Application Priority Data

Mar. 6, 1978 [JP] Japan .................................. 53-26380

[51] Int. Cl.³ ............................................ G11B 15/60
[52] U.S. Cl. .............................................. 360/130.23
[58] Field of Search ...................... 360/130.23, 130.24, 360/85

[56] References Cited

U.S. PATENT DOCUMENTS

| | | | |
|---|---|---|---|
| 3,213,193 | 10/1965 | Konishi et al. | 360/130.23 |
| 3,247,329 | 4/1966 | Tomita et al. | 360/130.23 |

FOREIGN PATENT DOCUMENTS

46-1790  1/1971  Japan .................................. 360/130.23

*Primary Examiner*—Robert S. Tupper
*Attorney, Agent, or Firm*—Lewis H. Eslinger; Alvin Sinderbrand

[57] ABSTRACT

A recording and/or reproducing apparatus is provided with a head disc around the periphery of which a tape is wrapped to contact a head which is sustained at the marginal portion of the head disc. The head scans the tape in response to the rotation of the head disc to record signals thereon and/or to reproduce signals therefrom. The apparatus is provided with a device to reduce the vibration of the tape which is generated when the head separates from the tape. This device may include a projection which pushes against the tape near the position where the head separates from the tape, or a squeezing plate which faces generally parallel to the tape and produces an air damping effect upon the tape.

30 Claims, 37 Drawing Figures

RECORDING AND/OR REPRODUCING APPARATUS FOR REDUCING TAPE VIBRATION

BACKGROUND OF THE INVENTION

1. Field of the Invention

This invention generally relates to a recording and/or reproducing apparatus and more particularly is directed, but not limited to, a VTR (Video Tape Recorder) wherein a tape is wrapped on the periphery of a head disc and contacts plural heads mounted at the periphery of the head disc to record signals on the tape and/or to reproduce signals from the tape by scanning the heads across the tape in response to the rotation of the head disc.

2. Description of the Prior Art

In a VTR for magnetically recording and/or reproducing video signals by means of magnetic tape, plural heads are mounted on the head disc and the tops of the heads are projected radially from the periphery of the head disc for contacting with magnetic tape wrapped on the periphery of the head disc. Accordingly, the magnetic tape, which is made of polymeric film and has a viscoelastic characteristic, is partially deformed by the projection of the heads beyond the periphery of the head disc as the rotation of the head disc causes the heads to scan across the surface of the tape. These deformations of the magnetic tape move with the heads around the head disc to the position where the magnetic tape is separated from the periphery of the head disc by a tape guide member. The heads apply frictional forces to the magnetic tape from the point where the heads begin to contact the tape to the above mentioned separation point. These frictional forces decrease very rapidly when the above-mentioned heads pass over the separating point. Further, the magnetic tape receives not only the longitudinal tension provided by the tape transport mechanism of the VTR but also a radially directed normal force at the portion of the tape which is wrapped on the head disc. The deformations of the magnetic tape caused by the projection of the heads are quickly removed by this normal force. But the portion of the above-mentioned magnetic tape between the separating point and the tape guide member does not receive such a normal force, and hence the removal of the deformations of the tape caused by the projection of the heads does not occur as rapidly in this portion of the tape as it does at the portion of the tape which is wrapped around the head disc. Accordingly, the magnetic tape vibrates between the above-mentioned separating point and the tape guide member.

Further, air is led into the spaces between the periphery of the head disc and the magnetic tape in response to the rotation of the head disc and this air is discharged at the above mentioned separating point. Hence, the air pressure between the tape and of the head disc at this discharging point is lower than the atmospheric pressure, and the magnetic tape projects or is curved radially toward the center of the head disc at this location. When this projected portion of the magnetic tape is struck by the heads it is pushed out from the head disc, causing vibration. The vibration of this portion of the magnetic tape away from and toward the periphery of the head disc is converted into longitudinal vibration of the magnetic tape upon the periphery of the head disc. Such longitudinal vibration causes time base errors, which appear as flickers on a reproduced picture.

SUMMARY OF THE INVENTION

One object of this invention is to prevent a tape from vibrating when heads separate from that portion of it which is wrapped on the periphery of a head disc.

Another object of this invention is to provide a recording and/or reproducing apparatus wherein time base error of signals due to the vibration of tape is restrained.

According to an aspect of the present invention, there is provided a recording and/or reproducing apparatus wherein a tape is wrapped on the periphery of a head disc and is made to contact at least two heads which are mounted at the periphery of the head disc for the purpose of recording signals on the tape and/or reproducing signals from the tape by rotating the head disc so that the heads scan across the surface of the tape. The apparatus is improved in that it is provided with means to prevent the tape from vibrating when the heads separate from the tape.

The above, and other objects, features and advantages of this invention will be apparent from the following detailed description of illustrative embodiments thereof which is to be read in connection with the accompanying drawings.

BRIEF DESCRIPTION OF THE DRAWINGS

FIG. 8A to FIG. 8I are perspective views of modified tape guide members according to the first embodiment of this invention;

FIG. 16A to FIG. 16C are elevational views modifications of the third embodiment.

FIG. 20A to FIG. 20F are perspective views of modified squeezing plates according to the fourth embodiment of this invention;

DESCRIPTION OF THE PREFERRED EMBODIMENTS

Figure 1:
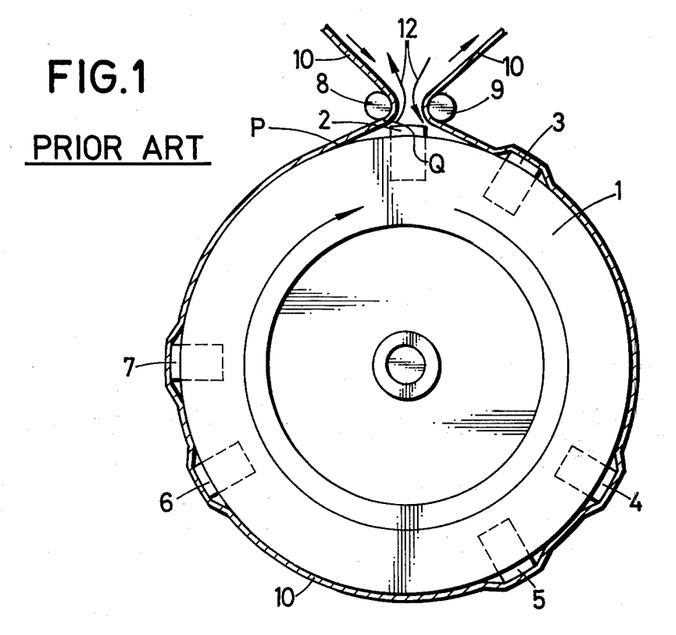
FIG. 1 is a schematic elevational view of a conventional VTR of the high band direct FM recording type.

Before proceeding with a detailed description of embodiments of this invention, and for the purpose of clearly contrasting therewith, an example of a conventional VTR for recording video signals on magnetic tape and/or reproducing video signals from magnetic tape will be described with reference to FIG. 1 to FIG. 4. Among various kinds of VTRs, a VTR of the high band direct FM recording type is used specially in broadcasting stations or production studios. The VTR is provided with plural, for example, six magnetic heads on the peripheral portion of a head disc 1 so that the VTR has an editing function and so called "read-after-write" function. That is, as shown in FIG. 1 there are provided on the peripheral portion of the head disc 1 a video head 2, a sync head 3 for recording vertical synchronizing signals, a video erasing head 4, a sync erasing head 5, a confidence video head 6 for instantaneously reproducing the recorded video signals and a confidence sync head 7. The video erasing head 4 and the sync erasing head 5 are positioned at an angle of 120° prior to the video head 2 and the sync head 3, respectively, in the rotational direction (clockwise direction in FIG. 1) of the head disc 1. Further, the confidence video head 6 and the confidence sync head 7 are positioned at an angle of 120° behind to the video head 2 and the sync head 3, respectively, in the rotational direction of the head disc 1. Still more, the sync head 3, the sync erasing head 5 and the confidence sync head 7 are positioned, respectively, at an angle of 30° prior to the video head 2, video erasing head 4 and the confidence video head 6 in the rotational direction of the head disc 1. Accordingly, the vertical synchronizing signals previously recorded on a magnetic tape 10 are erased by the sync erasing head 5, and new vertical synchronizing signals are recorded on the magnetic tape 10 by the sync head 3, and then recorded signals are read by the confidence sync head 7 and reproduced instantaneously. Previously recorded video signals are erased by the erasing head 4, and new video signals are recorded by the video head 2, and then newly recorded signals are instantaneously reproduced by the confidence video head 6. The video head 2, the video erasing head 4 and the confidence video head 6 are spaced relative to the sync head 3, the sync erasing head 5 and the confidence sync head 7, respectively, on the peripheral surface of the head disc 1, which is in the axial direction of the disc 1 or substantially in the direction of the width of the magnetic tape 10. The magnetic tape 10 is wrapped around the outer periphery of the head disc 1 over an arc of about 300° through a pair of tape guide members 8 and 9. The magnetic tape 10 runs against the direction in which the head disc 1 rotates, that is, the magnetic tape 10 runs counter-clockwise around the head disc 1 in FIG. 1.

Figure 2:
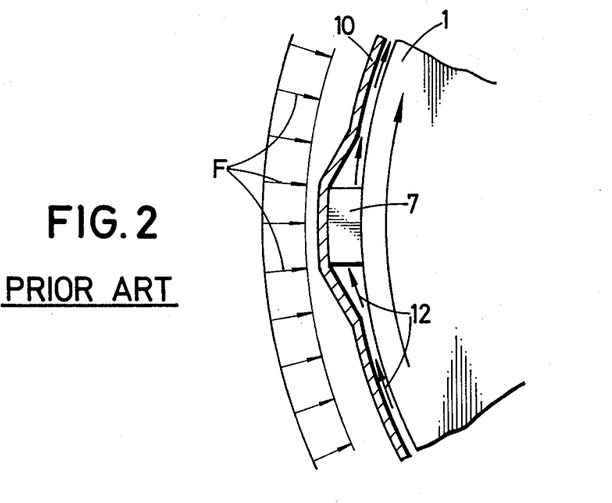
FIG. 2 is a fragmentary enlarged elevational view of the VTR shown in FIG. 1.

In the above mentioned VTR, the heads 2, 3, 4, 5, 6 and 7 are slightly, for example, about 100 μm, projected from the periphery of the head disc 1. Further, the magnetic tape 10 has viscoelastic characteristics because the magnetic tape is made of polymeric film on which a magnetic layer is formed. Accordingly, the magnetic tape 10 is deformed into the shape of chevron partially as shown in FIG. 2, when the heads 2, 3, 4, 5, 6 and 7 contact with the magnetic tape 10 in response to the rotation of the head disc 1 at a high speed relative to the magnetic tape 10, which runs at relatively slow speed.

The chevron deformation of the magnetic tape 10 moves to the position denoted by P in FIG. 1. At the position P, the magnetic tape 10 begins to separate from the peripheral surface of the head disc 1 and travels in a tangential path toward the tape guide member 8. The heads 2, 3, 4, 5, 6 and 7 apply frictional forces to the magnetic tape 10 from the point where the heads begin to contact with the tape 10 to the point P. Accordingly, the dynamic effects of the heads 2, 3, 4, 5, 6 and 7 upon the magnetic tape 10 change at the time when the heads pass over the point P. Further, the magnetic tape 10 receives not only the longitudinal tension supplied by the tape transport mechanism but also the radially directed normal force denoted by F in FIG. 2 and FIG. 3 along the portion of the tape which is wrapped on the periphery of the head disc 1. This normal force results because the magnetic tape 10 is wrapped around the head disc 1 under longitudinal tension and it causes tape 10 to be pressed to the periphery of the head disc. The chevron-shaped deformation caused as a head scans across a given portion of the magnetic tape 10 is quickly removed by this normal force. But the tape portion between the points P and Q (where the magnetic tape 10 contacts with the tape guide member 8) of the magnetic tape 10 does not receive this normal force because this tape portion is not curved but straight. Therefore, the removal of the chevron-shaped deformation of the tape caused by the projection of the heads does not occur as rapidly in this portion of the tape as it does at that portion of the tape which is wrapped around head disc 1. For this reason, the portion of the magnetic tape 10 between the point P and the point Q vibrates in a direction perpendicular to its length.

Figure 3:
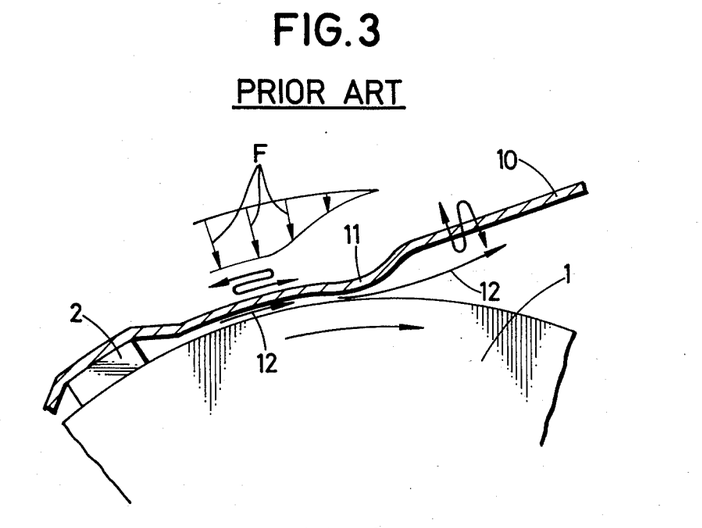
FIG. 3 is another fragmentary enlarged elevational view of the VTR shown in FIG. 1.

Further, in the VTR, air 12 is led into the space between the periphery of the head disc 1 and the magnetic tape 10 in response to the rotation of the head disc 1, because the head disc 1 rotates clockwise, as shown in FIG. 1, at high speed. The magnetic tape 10 runs at a relatively low speed around the peripheral surface of the head disc 1 separated from that peripheral surface by a thin air layer. The air 12 is discharged from the space between the periphery of head disc 1 and the magnetic tape 10 near the point P. The pressure of the space in the discharging point is lower than the surrounding atmospheric pressure. Therefore, a tape portion 11 corresponding to the discharging point of the air 12 is biased radially toward the center of the head disc 1 by the atmospheric pressure as shown in FIG. 3. This phenomenon is known as the so called "pressure spike". When the biased portion 11 of the magnetic tape is struck by the heads 2, 3, 4, 5, 6 and 7 it is pushed out from the head disc 1, causing the portion of the magnetic tape 10 between the point P and the point Q to vibrate.

Figure 4:
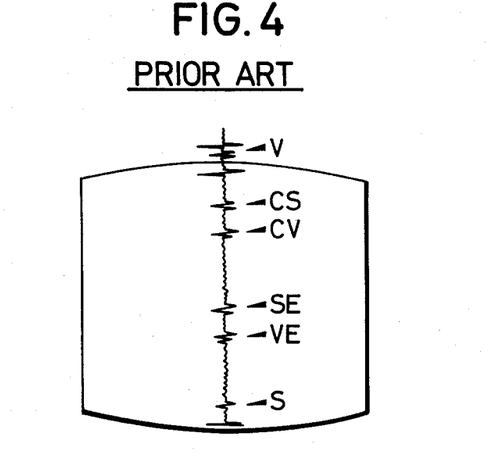
FIG. 4 is an elevational view of a picture reproduced through the VTR shown in FIG. 1.

The above described vibration of the portion of tape 10 between the point P and the point Q away from and toward head disc 1 results in longitudinal vibration of the portion of the magnetic tape 10 which is wrapped around the periphery of the head disc 1. As a result, the wrapped portion of the magnetic tape 10 expands and contracts longitudinally, and the time base of the video signal expands and contracts alternately to cause time base errors. For this reason, flickers appear on a reproduced picture as shown in FIG. 4. The flickers correspond to the vibrations produced when the heads, 2, 3, 4, 5, 6 and 7 pass over the point P of the magnetic tape 10. The flickers denoted by V, S, VE, SE, CV, and CS in FIG. 4 correspond to the vibrations due to the video head 2, sync head 3, video erasing head 4, sync erasing head 5, confidence video head 6 and confidence sync head 7, respectively. Accordingly, the reproduced picture of the VTR is disturbed and obscured.

The present invention is directed to solve the above mentioned problems. According to the present invention, there is provided means to prevent a tape from vibrating. Accordingly, the tape is prevented from longitudinal expansions and contractions, and hence the time base of the video signal does not vary.

Now below there will be described the embodiments of this invention with reference to the accompanying drawings in which elements corresponding to those in the previously described conventional VTR are denoted by the same reference numerals and the description thereof will be omitted.

Figure 5:
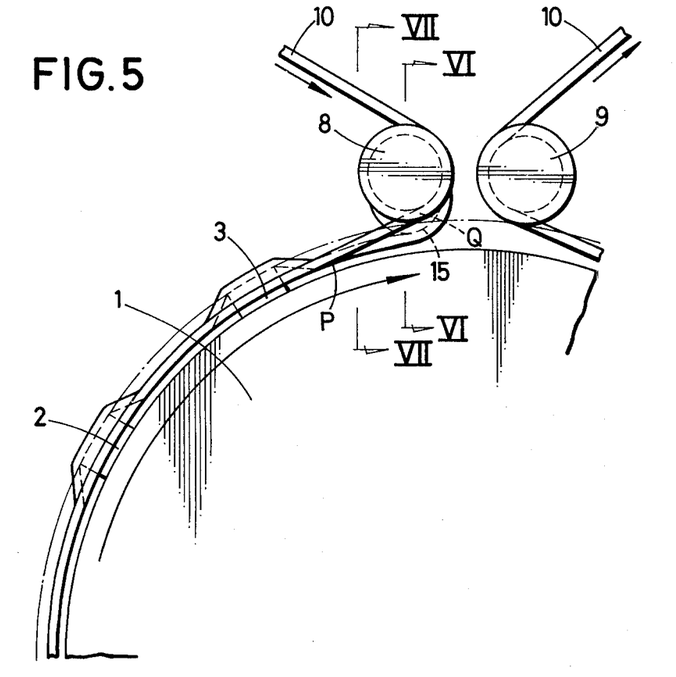
FIG. 5 is a fragmentary enlarged elevational view of a VTR according to a first embodiment of this invention.
Figure 6:
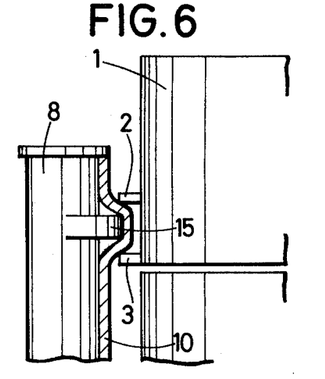
FIG. 6 is a cross sectional view taken along the line VI—VI in FIG. 5.
Figure 7:
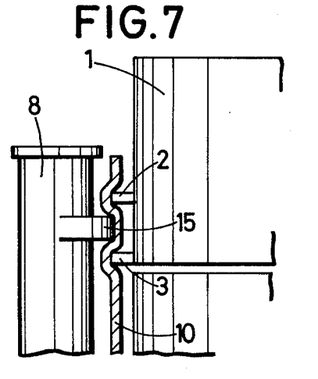
FIG. 7 is a cross sectional view taken along the line VII—VII in FIG. 6.

Referring now to FIG. 5, FIG. 6 and FIG. 7, it will be seen that preventing means for preventing the magnetic tape 10 from vibrating according to the first embodiment of this invention includes a projection 15 formed integrally on the tape guide member 8 which is positioned so as to guide the path of the tape after it separates from the head disc 1. The projection 15 contacts with the magnetic tape 10 to prevent the portion of that tape between the point P and the point Q of the from vibrating in a direction perpendicular to its length. The projection 15 is formed at the position near which the heads 2, 3, 4, 5, 6 and 7 pass over. In other words, the levels of the heads are nearly equal to the level of the projection 15 in the longitudinal direction of the tape guide member 8, which is also the axial direction of the head disc 1. The tension of the portion of tape between points P and Q is increased by its contact with the projection 15, decreasing the deformation of the magnetic tape 10 caused when the heads 2, 3, 4, 5 6 and 7 separate from the magnetic tape 10, and reducing the length of time required to restore the magnetic tape 10 from deformations caused by the scanning or heads. Further, the projection 15 is formed in the longitudinal direction of the member 8 at a position between the position over which the heads 2, 4 and 6 pass and the position over which the heads 3, 5 and 7 pass, as shown in FIG. 6 and FIG. 7. Accordingly, the vibrations due to the heads 2, 4 and 6 and those due to the heads 3, 5 and 7 are effectively prevented. The tape tension of the magnetic tape 10 is increased by the projection 15, as shown in FIG. 6, and the chevron-shaped or mountain-shaped deformation of the magnetic tape 10 is restrained by the projection 15, as shown in FIG. 7, when the heads 2, 3, 4, 5, 6 and 7 separate from the magnetic tape 10.

Figure 8A:
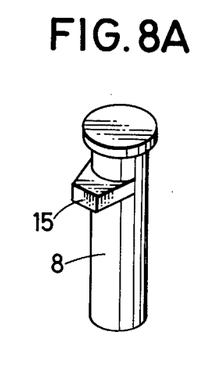
Figure 8B:
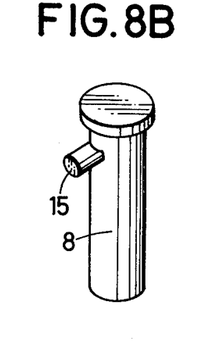
Figure 8C:
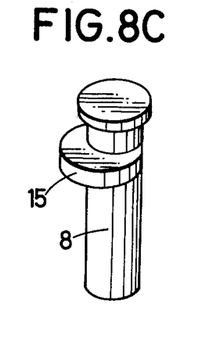
Figure 8D:
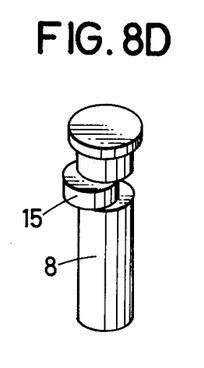
Figure 8E:
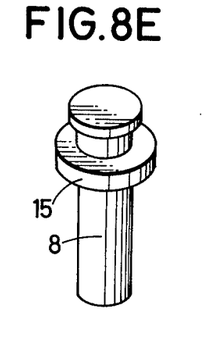
Figure 8F:
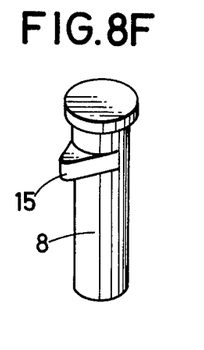
Figure 8G:
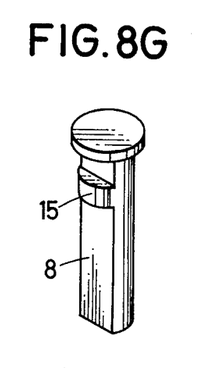
Figure 8H:
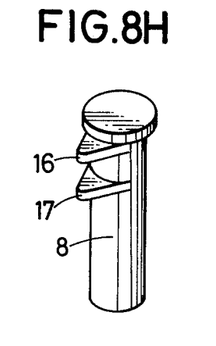
Figure 8I:
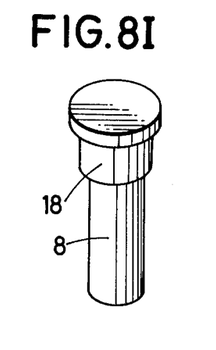

The shape of the projection 15 is not limited to that shown in FIG. 5 to FIG. 7, but various modifications may be made as shown in FIG. 8A to FIG. 8G wherein various kinds of projections 15 are formed on the tape guide member 8 at the predetermined level. In addition, the preventing means may comprise a pair of projections 16 and 17, as shown in FIG. 8H. The projection 16 and the projection 17 are spaced from each other in the longitudinal direction of the tape guide member 8 so that the projection 16 is positioned above the position over which the heads 2, 4 and 6 pass, and so that the projection 17 is positioned under the position over which the heads 3, 5 and 7 pass. Furthermore, the preventing means may include a large radius portion 18 coaxially and integrally formed on the top of the tape guide member 8 as shown in FIG. 8I. The portion 18 is positioned above the position over which the heads 2, 4 and 6 pass.

Figure 9:
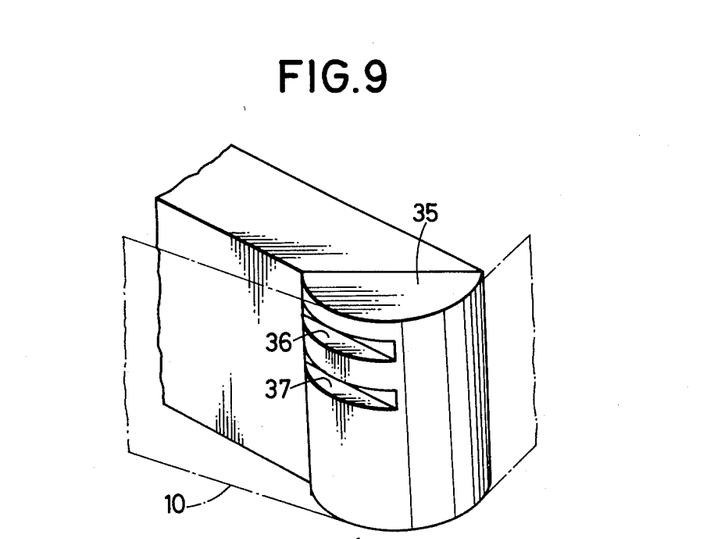
FIG. 9 is a perspective view of a further modification of the first embodiment.
Figure 10:
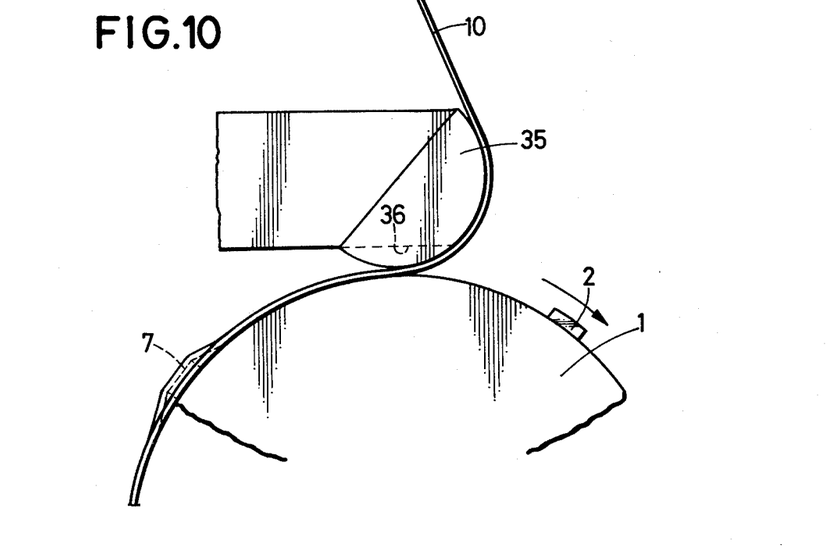
FIG. 10 is an elevational view of the modification shown in FIG. 9.

Alternatively, the preventing means may be a tape guide member itself, which is positioned closely about the periphery of the head disc 1 across the whole width of the magnetic tape 10, instead of forming a projection on the tape guide member. The cross-sectional shape of a tape guide member 35 according to this modification is semi-circular, the radius of which is relatively large and which is arranged beside the head disc 1 very closely to the latter as shown in FIG. 9 and FIG. 10. Further, a pair of recesses 36 and 37 are formed on the periphery of the tape guide member 35 at a level which corresponds to the heads 2, 4 and 6 and the heads 3, 5 and 7, respectively, to receive projections in the surface of tape 10 caused by the scanning of those heads. According to this modification, the magnetic tape 10 contacts with the tape guide member 35 as soon as the magnetic tape 10 separates from the head disc 1. Therefore, the length of the portion of the magnetic tape 10 which does not contact either the tape guide 35 or the head disc 1 becomes very short, and the magnetic tape 10 is virtually preventd from vibrating because the tape portion corresponding to that between the point P and the point Q in FIG. 1 or FIG. 5 is reduced to a minimum. Further, the normal force of the magnetic tape 10 against the tape guide 35 is decreased because the radius of the tape guide member 35 is relatively large.

Figure 11:
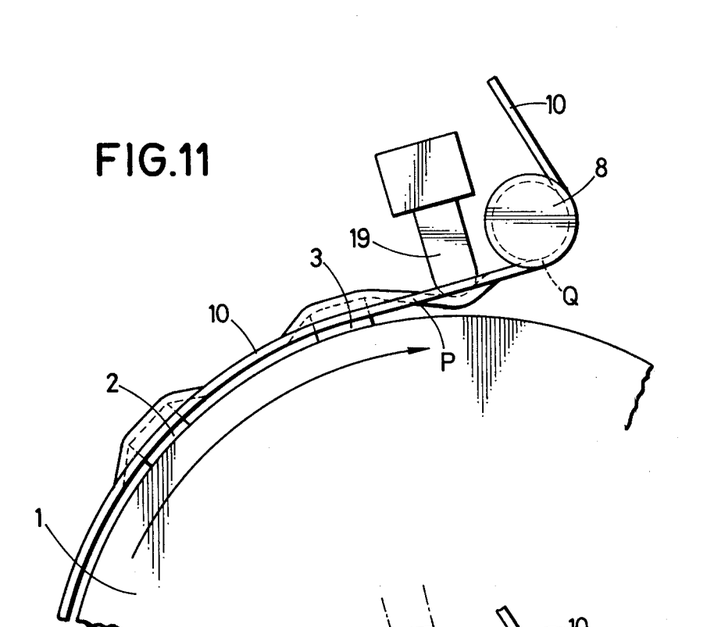
FIG. 11 is a fragmentary elevational view of a VTR according to a second embodiment of this invention.

Next, there will be described the second embodiment of this invention with reference to FIG. 11. In the above first embodiment, the projection is integrally formed on the tape guide member 8 and contacts with the magnetic tape 10 to prevent the latter from vibration. Alternatively, in the second embodiment, the preventing means is separated from the tape guide member 8. For example, the preventing means comprises a preventing member 19, the shape of which is similar to that of a pin, and the preventing member 19 is arranged so that the top of the member 19 contacts with the back surface of the magnetic tape 10 as shown in FIG. 11. Therefore, the tape tension of the magnetic tape 10 is increased by the member 19 and the magnetic tape 10 is prevented from vibrating. The shape of the preventing member may be modified to the shape of a column, cylinder, rectangular rod and so on. The member 19 contacts with the magnetic tape 10 at the position between the position corresponding to that of the upper heads 2, 4 and 6 and the position corresponding to that of the lower heads 3, 5 and 7 in the direction of the width of the magnetic tape 10. Alternatively, for example, a pair of preventing members may be arranged to be spaced from each other in the axial direction of the head disc 1 so that the upper member contacts the magnetic tape 10 at a position higher than the corresponding position of the heads 2, 4 and 6 and the lower member contacts a the magnetic tape 10 at a position lower than the corresponding position of the heads 3, 5 and 7.

Figure 12:
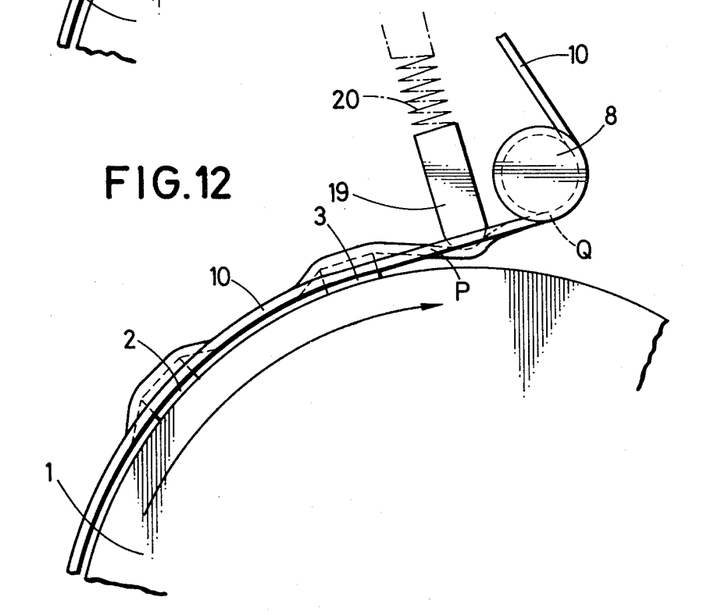
FIG. 12 is a fragmentary elevational view of a VTR which includes a modified preventing means of the second embodiment of this invention.

Next, a modification of the second embodiment will be described with reference to FIG. 12. A preventing member 19 of this modification is slidably supported, instead of fixedly supported, and is urged by a coil spring 20 so that the top of the preventing member 19 elastically pushes the surface of the magnetic tape 10.

Figure 13:
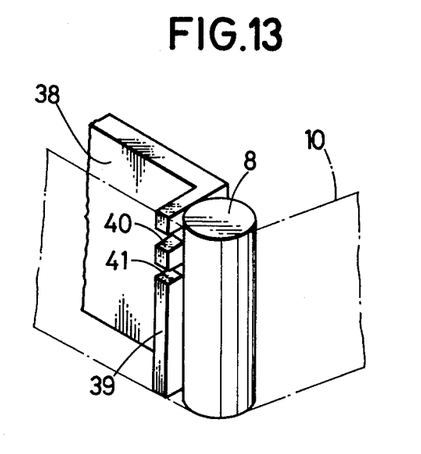
FIG. 13 is a perspective view of a further modification of the second embodiment of this invention.
Figure 14:
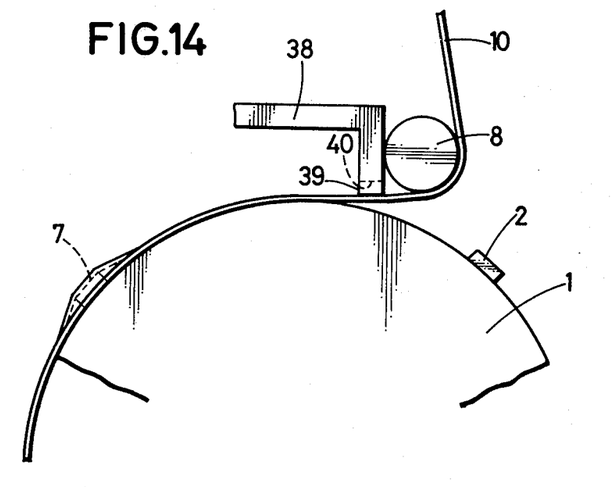
FIG. 14 is a schematic elevational view of a VTR which includes a modified preventing means shown in FIG. 13.

As well as being designed to push only against a portion of the width of tape 10, the preventing member of the second embodiment can be designed to push against substantially all of the width of that tape. That is, the preventing member is an L-shaped member 38 which is arranged beside the tape guide member 8 as shown in FIG. 13. A projected portion 39 projecting laterally from the member 38 contacts with substantially the whole width of the magnetic tape 10 as shown in FIG. 13 and FIG. 14. A pair of recesses 40 and 41 are formed on the front surface of the projected portion 39 of the member 38 to receive the projections in the surface of tape 10 caused by the scanning of the heads 2, 4 and 6 and the heads 3, 5 and 7, respectively.

Next, there will be described the third embodiment of this invention with reference to FIG. 15. The preventing means of this embodiment includes a member the surface of which is covered with innumerable feather-like elastic projections, for example, a cylindrical member 22, the periphery of which is covered with a felt 21. The periphery of the member 22 contacts with the magnetic tape 10 to prevent the latter from vibrating between the point P and the point Q. Further, the cylindrical member 22 is supported at the top of a lever 23 which is rotatably supported by a pin 24 and is urged clockwise in FIG. 15 by a coil spring 25 so that the felt 21 attached to the periphery of the member 22 elastically contacts the magnetic tape 10. The felt 21 may extend over the whole width of the magnetic tape 10 or the partial width of that tape.

The wrapping angle of the magnetic tape 10 against the felt 21 on the cylindrical member 22 is so small that the friction of tape 10 against the felt 21 does not improperly influence the normal recording or reproducing operation. But, the magnetic tape 10 is effectively prevented from vibrating when the heads 2, 3, 4, 5, 6 and 7 separate from the magnetic tape 10 because the feather-like elastic projections which are formed on the outer surface of the felt 21 contact with the magnetic tape 10 to restrain the vibration of the magnetic tape 10 away from and toward head disc 1. Accordingly, the longitudinal vibration of the magnetic tape 10 is restrained, and the stable and preferable reproducing of the video signal is accomplished.

Figures 15, 16B:
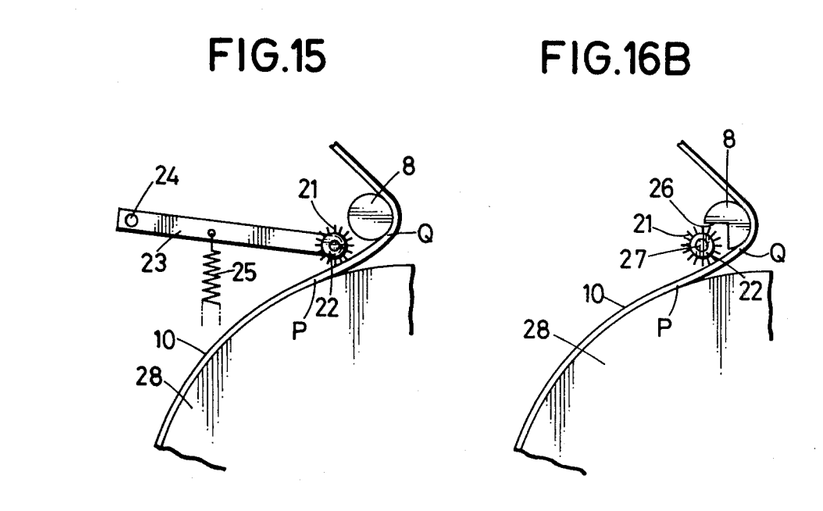
FIG. 15 is a schematic elevational view of a VTR which includes a preventing means according to a third embodiment of this invention.
Figure 16A:
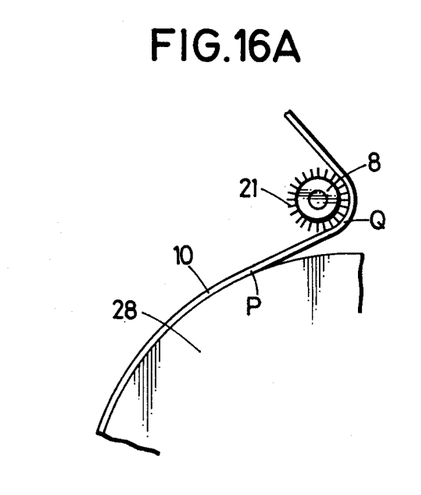
Figure 16C:
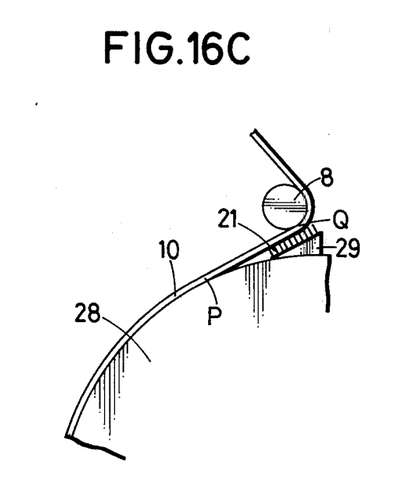

The modifications of the above mentioned third embodiment will be seen in FIG. 16A, FIG. 16B and FIG. 16C. The felt 21 is attached to a cylindrical member 22 which is supported by a lever 23 in FIG. 15, but the felt 21 may be arranged on the periphery of a tape guide member 8 as shown in FIG. 16A. Further, the felt 21 may be wrapped on a rod-like member 27 which is arranged in a rectangular cut-out portion 26 formed on the tape guide member 8 as shown in FIG. 16B. Furthermore, the felt 21 may be attached to a supporting member 29, the outer surface of which is declined and which is sustained by a stationary guide drum 28 arranged under the head disc 1, as shown in FIG. 16C.

Figure 17:
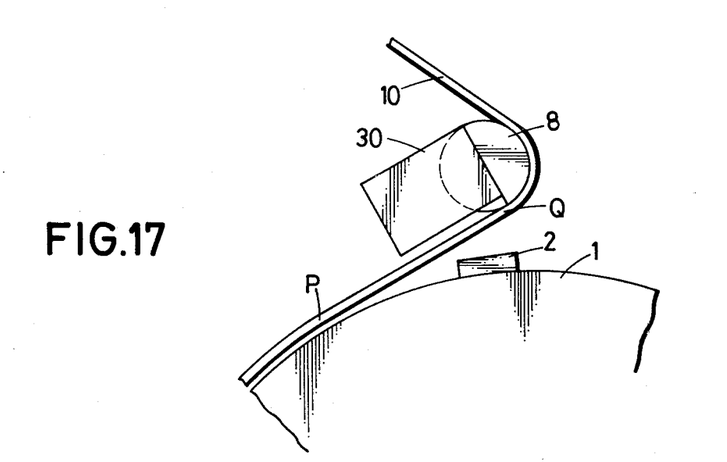
FIG. 17 is a schematic elevational view of a VTR which includes a squeezing plate according to a fourth embodiment of this invention.
Figure 18:
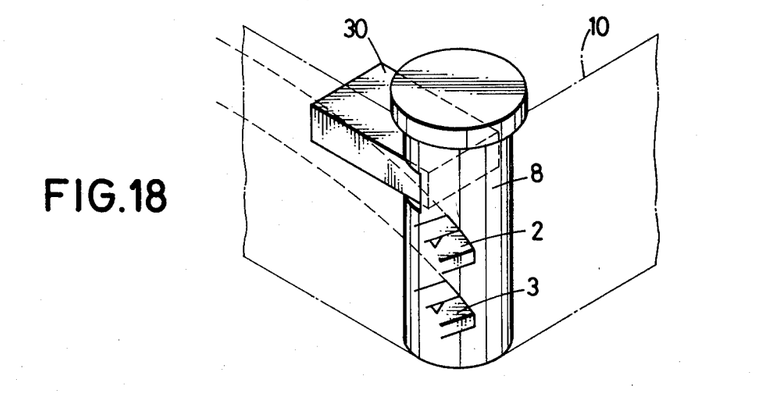
FIG. 18 is a perspective view of the squeezing plate shown in FIG. 17.
Figure 19:
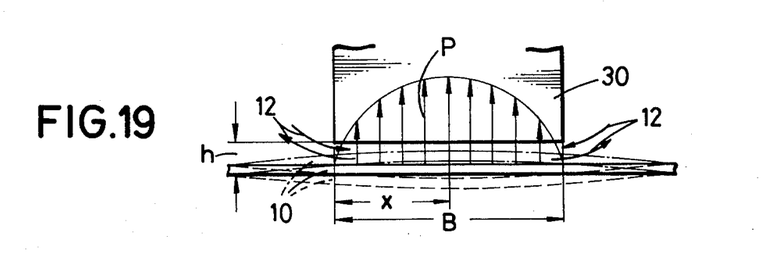
FIG. 19 is an enlarged elevational view of the squeezing plate shown in FIG. 17 and FIG. 18.

FIG. 17, FIG. 18 and FIG. 19 illustrate a fourth embodiment of this invention. In this embodiment, the preventing means includes a squeezing plate 30 which faces generally parallel to the portion of tape 10 between the point P and the point Q, the plate 30 being separated from the tape 10 at a length of a few microns so as to prevent the magnetic tape 10 from vibration. Further, the squeezing plate 30 is arranged at a position in the longitudinal direction of the tape guide member 8, between the position over which the heads 2, 4 and 6 pass and the position over which the heads 3, 5 and 7 pass, as shown in FIG 18. The squeezing plate 30 is integrally formed with the tape guide member 8, and the squeezing surface of the plate 30 is lapped to form a mirror-like surface.

By the arrangement of the squeezing plate 30 which faces the magnetic tape 10, a dynamic pressure P is generated when the clearance h between the plate 30 and the tape 10 changes in response to the vibration of the magnetic tape 10, as shown in FIG. 19. The dynamic pressure P is given by the following equation through the Reynold's equation:

$$P = \frac{12\mu}{h^3} \frac{\partial h}{\partial t} \chi (\chi - B)$$

in which $\mu$ equals the coefficient of viscosity of air, t equals time, $\gamma h/\gamma t$ equals the rate of change of the clearance h, X equals the distance from one end of the plate 30 to an arbitary point in the longitudinal direction of the magnetic tape 10, and B equals the length of the squeezing plate 30. Assuming that the effective area of the squeezing plate 30 is equal to S, then the repulsive force F shown by the following equation works on the magnetic tape 10.

$$F = \int SPds$$

That is, the magnetic tape 10 is dampened by air and is prevented from vibration. Therefore, flickers do not occur on a reproduced picture.

Figure 20A:
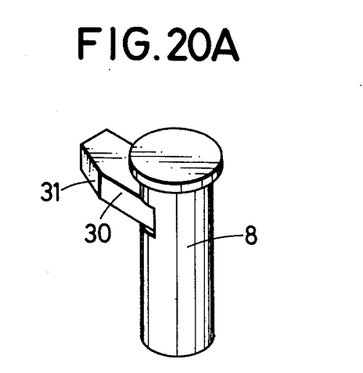
Figure 20B:
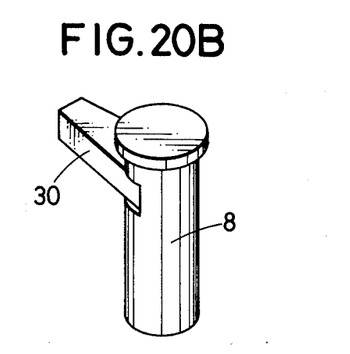
Figure 20C:
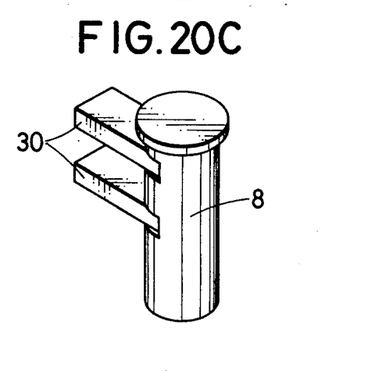
Figure 20D:
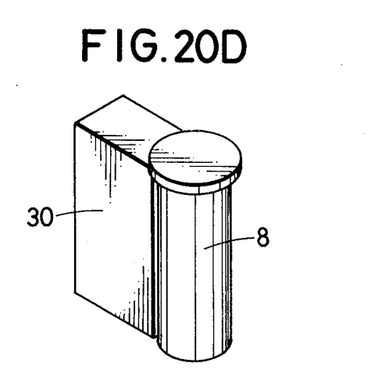
Figure 20E:
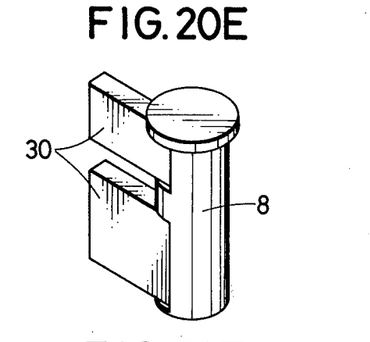
Figure 20F:
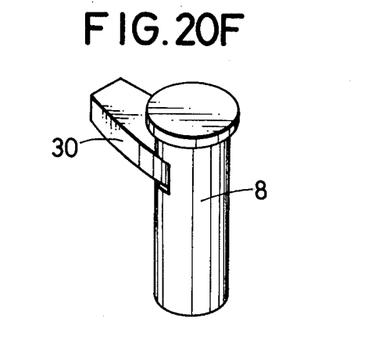

The squeezing plate 30 is not limited to the embodiment shown in FIG. 17 to FIG. 19. Modified squeezing plates 30 are shown in FIG. 20A to FIG. 20F. The free end of the squeezing plate 30 may be declined as shown in FIG. 20A, that is a declined surface 31 may be formed at the side of the squeezing plate 30 from which the tape 10 travels toward the guide member 8. Further, the whole surface of the squeezing plate 30 may be declined so that the distance between the squeezing plate 30 and the magnetic tape 10 decreases as the tape path progresses away from head disc 1 toward guide member 8, as shown in FIG. 20B. Furthermore, the preventing means may include a pair of squeezing plates 30 which are spaced from each other in the longitudinal direction of the tape guide member 8 so that the heads 2, 3, 4, 5, 6 and 7 pass through the space between the plates 30 as shown in FIG. 20C. Still more, the squeezing plate 30 may have sufficient width that the plate 30 extends over the whole width of the magnetic tape 10 as shown in FIG. 20D. As shown in FIG. 20E, a cut-out portion may be formed on a squeezing plate 30 that extends over the whole width of the magnetic tape 10 so that the squeezing plate may be placed very close to the periphery of head disc 1 without obstructing the passage of the heads 2, 3, 4, 5, 6 and 7. Still more, the squeezing plate 30 may have a curved surface, the radius of which may be relatively large as shown in FIG. 20F.

Figure 21:
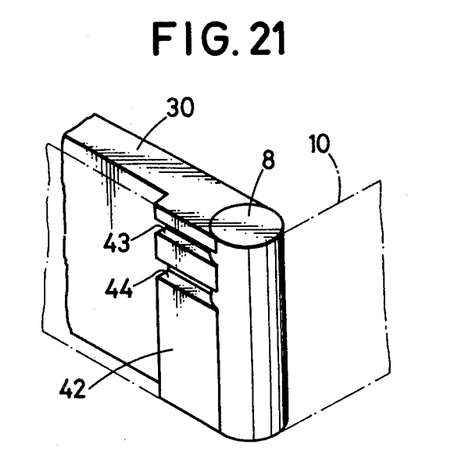
FIG. 21 is a perspective view of a further modified squeezing plate according to the fourth embodiment of this invention.
Figure 22:
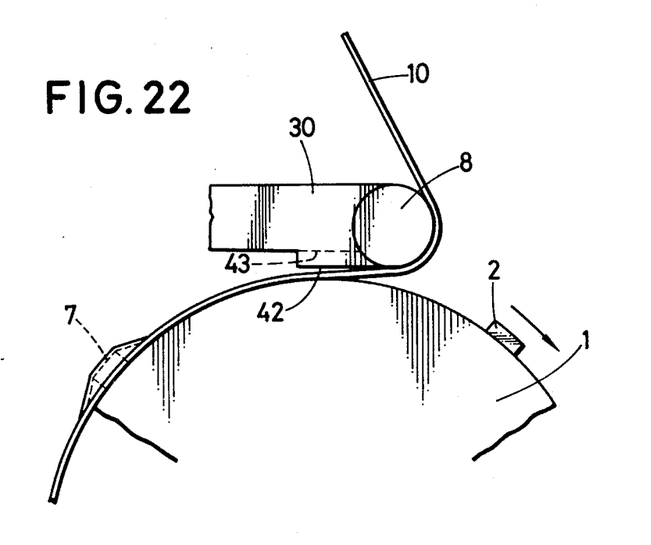
FIG. 22 is a schematic elevational view of a VTR which includes the squeezing plate shown in FIG. 21.

FIG. 21 and FIG. 22 illustrate a further modification of this embodiment, wherein the squeezing plate 30 has sufficient width to extend over the whole width of the magnetic tape 10, and a pair of recess 43 and 44 are formed on the squeezing surface 42 of the plate 30. The recess 43 is formed at the position corresponding to that over which the heads 2, 4 and 6 pass, to relieve those heads. Similarly, the recess 44 is formed at the position corresponding to that over which the heads 3, 5 and 7 pass, to relieve those heads. By this arrangement, the squeezing effect can be obtained on the whole width of the magnetic tape 10, and the squeezing plate 30 can be very close to the periphery of the head disc 1.

As mentioned above, means for preventing a tape from vibrating is provided according to the present invention. Therefore, the vibration of a tape can be effectively prevented and the longitudinal expansions and constractions of the tape can be effectively restrained by this invention.

Although illustrative embodiments of this invention have been described in detail herein with reference to the accompanying drawings, it is to be understood that the invention is not limited to these precise embodiments or the described modifications, and that various changes and further modifications may be made therein by one skilled in the art without departing from the scope or sprit of the invention as defined in the appended claims.

For example, this invention may be applied to various kinds of VTRs, such as the so called home VTRs, in which the magnetic tape is helically scanned by heads, and in which certain components of the video signal are recorded at a lower frequency than the frequency at which they occur in the video signal, or such as VTRs of the high band direct FM recording type described in the above mentioned embodiments. Further, the number of heads is not limited to six, although the above mentioned embodiments relate to a VTR provided with six heads on the marginal portion of the head disc. For example, the present invention may be applied to a VTR that has two heads, positioned so that, one head is separated from the tape when the other head scans the tape.

What is claimed is:

1. In a recording and/or reproducing apparatus having a tape wrapped about the periphery of a head disc having at least two heads of a width smaller than the width of said tape and which are mounted at said periphery and projecting therefrom for the purpose of recording signals on said tape and/or reproducing signals from said tape by rotating said heads with said head disc while the tape is longitudinally moved so that said heads scan obliquely across the surface of said tape, the improvement comprising:
   main tape guiding means contacting the tape across the entire width of the tape and being spaced from said periphery of the head disc for guiding the tape in a path departing from said periphery at least by the distance said heads project therefrom so that said heads separate from said tape along said path; and
   vibration preventing means contacted at said path with a portion of the width of said tape for preventing said tape from vibrating when said heads separate from said tape.

2. A recording and/or reproducing apparatus according to claim 1, wherein said vibration preventing means is arranged near the position where said heads separate from said tape.

3. A recording and/or reproducing apparatus according to claim 1, wherein said vibration preventing means comprises at least one projection contacting said tape.

4. A recording and/or reproducing apparatus according to claim 3, wherein said projection is constituted by a projecting portion integrally formed on said main tape guiding means.

5. A recording and/or reproducing apparatus according to claim 3, wherein said projection is constituted by a projecting member independent of said main tape guiding means, and said projecting member is arranged between the position where said heads separate from said tape and the position where said main tape guiding means is arranged.

6. A recording and/or reproducing apparatus according to claim 5, wherein said projecting member is urged by a resilient member, so that said projecting member is biased against said tape.

7. A recording and/or reproducing apparatus according to claim 3, wherein said heads include a pair of heads which are spaced from each other in the direction of the width of said tape, and said projection is arranged in the direction of the width of said tape, between the positions at which each of said pair of heads passes closest to said tape.

8. A recording and/or reproducing apparatus according to claim 3, wherein said vibration preventing means comprises a pair of projections for contacting with said tape which are spaced from each other in the direction of the width of said tape so that said heads contact said tape at positions which are between the positions of said two projections in the direction of the width of said tape.

9. A recording and/or reproducing apparatus according to claim 3, wherein there are a pair of said heads which are spaced from each other in the direction of the width of said tape and said vibration preventing means comprises a pair of projections for contacting with said tape which are spaced from each other in the direction of the width of said tape so that said pair of heads contacts with said tape at positions which are between the positions at which said two projections contact said tape in the direction of the width of said tape.

10. A recording and/or reproducing apparatus according to claim 4, wherein said main tape guiding means includes a tape guide member having an at least part cylindrical surface contacting said tape across said entire width thereof, and another part of said surface of said tape guide member itself constitutes said vibration preventing means, at least one recess being formed in said other part of said surface of said tape guide member to accommodate bulges in the surface of said tape caused by said heads.

11. A recording and/or reproducing apparatus according to claim 5, wherein said projecting member extends over the whole width of said tape, at least one recess being formed in the contacting surface of said projecting member to receive projections of said tape caused by said heads.

12. A recording and/or reproducing apparatus according to claim 1, wherein said vibration preventing means comprises a member the surface of which is covered, at least in part, with innumerable feather-like elastic projections.

13. A recording and/or reproducing apparatus according to claim 3, wherein said member with innumerable feather-like elastic projections thereon is supported by a supporting member and is arranged between the position where said heads separate from said tape and the position where said main tape guiding means is arranged.

14. A recording and/or reproducing apparatus according to claim 13, wherein said supporting member comprises a lever which is rotatably supported and is urged by a resilient member, so that said member with innumerable feather-like elastic projections thereon is biased against said tape.

15. A recording and/or reproducing apparatus according to claim 12, wherein another part of said surface of said member comprises said main tape guiding means which is arranged so as to guide the path of said tape after it separates from said head disc.

16. A recording and/or reproducing apparatus according to claim 12, wherein said main tape guiding means includes a tape guide member, and wherein said member with innumerable featherlike elastic projections thereon is arranged in a cut-out portion formed in said tape guide member.

17. A recording and/or reproducing apparatus according to claim 12, wherein said member with innumerable feather-like elastic projections thereon is mounted on a stationary guide drum which is arranged coaxially with said head disc.

18. A recording and/or reproducing apparatus according to claim 1, wherein said vibration preventing means comprises a squeezing plate which faces generally parallel to a portion of said tape between the position where said heads separate from said tape and said main tape guiding means which is arranged so as to guide the path of said tape after it separates from said head disc, said squeezing plate producing an air damping effect on said tape.

19. A recording and/or reproducing apparatus according to claim 18, wherein said squeezing plate is supported by said main tape guiding means.

20. A recording and/or reproducing apparatus according to claim 18, wherein a declined surface is formed at the side of said squeezing plate which is nearer to the position where said heads separate from said tape than to said main tape guiding means, said declined surface being declined towards the tape in the direction in which the tape runs.

21. A recording and/or reproducing apparatus according to claim 18, wherein said squeezing plate is arranged in such a manner that the distance between said squeezing plate and said tape decreases along the direction in which said tape runs.

22. A recording and/or reproducing apparatus according to claim 18, wherein said heads include a pair of heads which are spaced from each other in the direction of the width of said tape, and said squeezing plate is arranged in the direction of the width of said tape, between the positions at which each of said pair of heads passes closest to said tape.

23. A recording and/or reproducing apparatus according to claim 18, wherein said vibration preventing means comprises two squeezing plates which are spaced from each other in the direction of the width of said tape so that said heads contact said tape at a position which is between the positions of said two squeezing plates in the direction of the width of said tape.

24. A recording and/or reproducing apparatus according to claim 18, wherein said squeezing plate extends over the whole width of said tape.

25. A recording and/or reproducing apparatus according to claim 24, wherein at least one recess is formed in the squeezing surface of said squeezing plate to receive projections of said tape caused by said heads.

26. In a recording and/or reproducing apparatus of the type having a cylindrical guide surface, means for transporting a recording tape to and away from said guide surface so that said tape is moved longitudinally and wraps around a portion of said guide surface, and at least one rotated transducer head which projects radially out from said guide surface so that, as said head rotates, it contacts a portion of said moved tape and pushes that contacted portion radially outward from said guide surface, said head being sufficiently narrow that it contacts less than the whole width of said tape and said head tending to cause an adjacent portion of said tape which is displaced from said head along a line perpendicular to the direction of its rotation to be lifted away from said guide surface; the improvement comprising a tape guide around which said tape is partially wrapped after it is transported away from said guide surface, and means defining a rigid surface integrally formed with said tape guide and which contacts said adjacent portion of said tape and pushes it toward said guide surface near the location at which the tape is separated from said guide surface and further which avoids contacting said portion of the tape contacted by said head so as not to obstruct rotation of said head and the consequent separation of said contacted portion of the tape from said guide surface.

27. In a recording and/or reproducing apparatus of the type having a cylindrical guide surface, means for transporting a recording tape to and away from said guide surface so that said tape is moved longitudinally and wraps around a portion of said guide surface, and at least one rotated transducer head which projects radially out from said guide surface so that, as said head rotates, it contacts a portion of said moved tape and pushes that contacted portion radially outward from said guide surface, said head being sufficiently narrow that it contacts less than the whole width of said tape and said head tending to cause an adjacent portion of said tape which is displaced from said head along a line perpendicular to the direction of its rotation to be lifted away from said guide surface; the improvement comprising resilient-compliant means acting on said tape in the direction toward said guide surface at the location at which said tape is separated from the guide surface, said resilient-compliant means being made of a plurality of their elastic projections and contacting both said adjacent and said contacted portions of said tape and being sufficiently resilient and compliant to bias said adjacent portion of said tape toward said guide surface while at the same time allowing said head to hold said contacted portion of said tape away from said guide surface against said resilient-compliant means without obstructing rotation of said head.

28. In a recording and/or reproducing apparatus of the type having a cylindrical guide surface, means for longitudinally moving a recording tape tangentially to and away from said guide surface so that said tape wraps around a portion of said guide surface, and at least one rotating transducer head which projects radially out from said guide surface so that, as said head rotates, it contacts a portion of said moving tape and pushes that contacted portion radially outward from said guide surface; the improvement comprising means defining a substantially flat surface extending generally parallel to the path of said tape as it is longitudinally moved tangentially away from said guide surface so that air pressure between said flat surface and said tape tends to dampen vibration of said tape at a point of separation of said head from the tape.

29. In a recording and/or reproducing apparatus of the type having a cylindrical guide surface, means for longitudinally moving a recording tape to and away from said guide surface so that said tape wraps around a portion of said guide surface, and at least one rotating transducer head which projects radially out from said guide surface so that, as said head rotates, it contacts a contacted portion of said moving tape and pushes that portion radially outward from said guide surface; the improvement comprising means defining a resilient surface placed to contact said tape after the tape separates from said guide surface so as to dampen vibration of said tape at a point of separation of said head from the tape.

30. A recording and/or reproducing apparatus according to claim 29, wherein said means defining a resilient surface includes a plurality of thin elastic projections.

* * * * *